July 26, 1955     T. G. STALEY     2,713,843
VARIABLE DEPTH MOTOR MOUNT

Filed Dec. 22, 1952     4 Sheets-Sheet 1

Thomas G. Staley
INVENTOR.

BY *Clarence A. O'Brien*
*and Harvey B. Jacobson*
Attorneys

July 26, 1955　　　T. G. STALEY　　　2,713,843

VARIABLE DEPTH MOTOR MOUNT

Filed Dec. 22, 1952　　　　　　　　　　　　4 Sheets-Sheet 2

Thomas G. Staley
INVENTOR.

BY *Clarence A. O'Brien*
*and Harvey B. Jacobson*
Attorneys

Thomas G. Staley
INVENTOR.

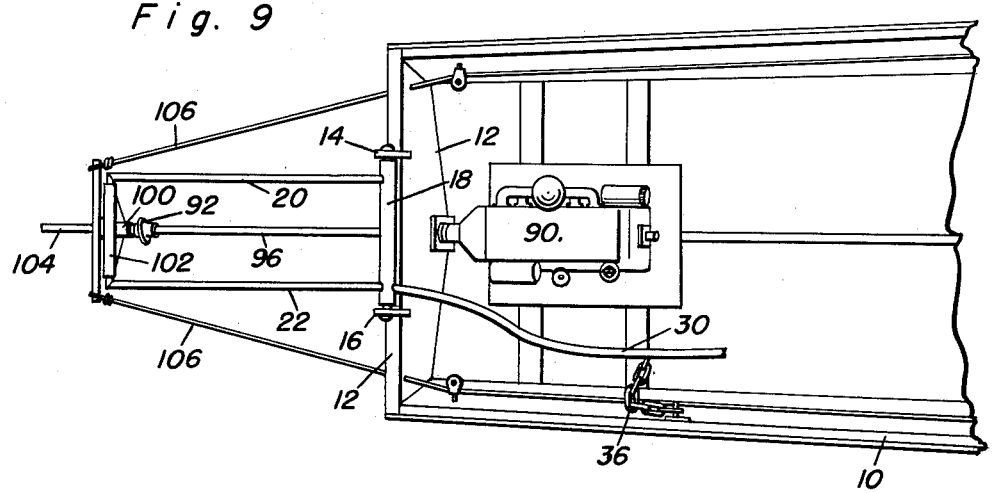
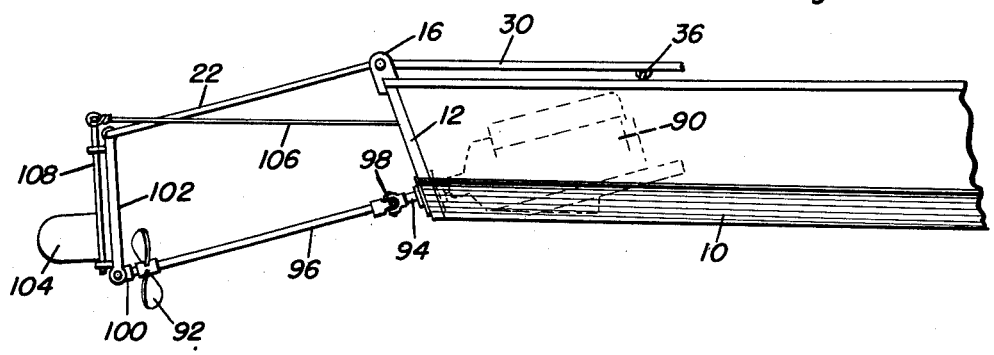
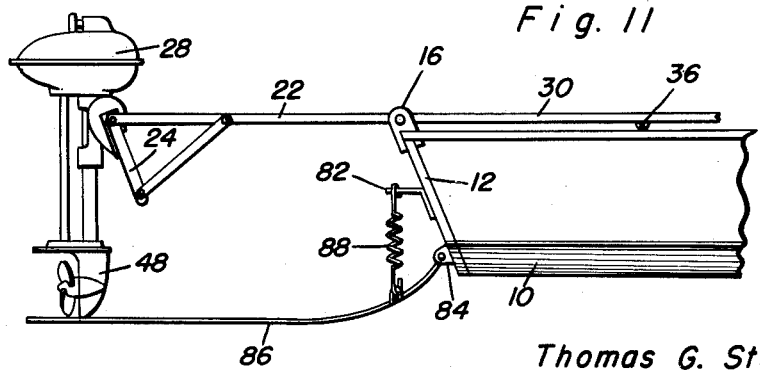

United States Patent Office 2,713,843
Patented July 26, 1955

2,713,843

VARIABLE DEPTH MOTOR MOUNT

Thomas G. Staley, Eagle Point, Oreg.

Application December 22, 1952, Serial No. 327,193

9 Claims. (Cl. 115—41)

This invention relates to a variable depth motor mount for outboard motors which is equally adapted for inboard motor drive shafts employing a universal joint in such drive shaft.

The particular object of this invention resides in the provision of means of mounting motors abaft the stern transom of a boat so that the propeller will be located behind the boat instead of under the boat. This mounting will also enable the motor to be moved up and down at will while in operation in order to place the propeller in deep or shallow draft, or to operate it partially emergent. When not in use, the mounting means enable the motor to be lifted clear of the water.

A further object of this variable depth motor mount is to reduce the combined draft of a boat and motor so that very shallow shoal waters can be navigated. In this arrangement of parts the propeller draft is not added to the draft of the boat.

A further object of this invention is to provide means for raising and lowering a motor suspended about a boat by using a lever having considerable mechanical advantage so that even relatively large motors can be adjusted up and down easily at the operator's will.

A further object is to provide an adjustable flexible mount which transmits thrust from the propeller to the boat through a linkage causing an offset translated vertical component of thrust to neutralize, reduce or eliminate the weight of the mount and weight of the motor, so that force of thrust carries the weight instead of the boat carrying it, and effectively making the weight sprung weight instead of unsprung weight.

A further object of this invention is to provide a control mechanism which will allow an operator of a boat to feel his way through shallow water by raising his propeller to clear obstacles and lowering it again so as to provide propulsion for the boat after the obstacle has been passed.

This invention makes it possible to utilize the elevated water level in the resurgent crest, or following wave or hump, in the wake of a boat as an ultra-shallow draft position for the propeller, so that the propeller is travelling in a position higher than the bottom of the boat while the operator is synchronizing the speed of the boat with the speed of the following wave, and provides means for thus positioning the propeller upwards while in operation and underway.

Other advantages of this construction reside in the fact that the motor may be located a distance behind the stern so it is outside and away from the boat thus removing the noise, fumes, noxious exhaust gases and the dripping of gasoline and oil into the boat and the resulting fire hazard from the boat proper providing greater comfort and safety for the occupants thereof.

A further object is to provide a pivoting skeg or guard which will in combination with a flexible motor mount, force the motor to rise or to tilt or to rise and tilt to clear obstacles safely.

A further form of the invention employing a parallelogram linkage has an object residing in the provision of a constant vertical angle (or other constant angle) for the propeller whether adjusted to a high or low position, so as to always maintain a constant thrust direction.

A yet further object of the invention is to provide means when an obstacle is encountered permitting the motor not only to tilt but may rise instead of tilting or may both simultaneously rise and tilt depending upon impact direction. The flexible linkage greatly reduces the impact shock because of the flexible linkage and because the weight of the motor is sprung weight, being sprung by thrust.

A further advantage of this invention is in the resulting greater freeboard at the stern. Whereas all standard outboard motors now require cutting down the stern transom to a 15 inch to a 17 inch notch even though this is often too little freeboard, the present mount permits the transom to be left its full height without any notches therein.

A yet further advantage is that the lever which is used to raise or lower the motor can if desired be pivotally mounted to swing back and forth sideways while still rigged for up and down leverage, and thus enable the motor to be steered by horizontal swinging of the lever while raising and lowering the lever by a vertical swing thereof. This single combination use lever can also carry the customary throttle control and any other control means so as to make for a simplified means of controlling the movement of the boat.

A further object is to stimulate steering agility and faster steering by increasing steering leverage caused by locating the propeller and motor a distance abaft the boat.

This invention also avoids or reduces damage to the propeller or motor from obstacles because there is less exposure of the propeller and motor due to the lesser draft and the easier kickup with the flexible rise and/or tilt, and because the operator can help the kick up by actuating the lever while the resistance to the obstacle is less because the motor weight is sprung.

An additional object is to provide adjustability at will while underway of the thrust line direction or thrust angle (tilt) and of the thrust line elevation (shallow or deep) for efficiency as related to load, trim, waves, speed, wind, etc.

Still further advantages of this invention reside in provision of a variable depth motor mount that is strong and durable, simple in construction and manufacture, and capable of being readily installed on various existing yachts, sailboats, barges, speedboats, rowboats, canoes, hydro-planes, and the like.

These, together with the various ancillary objects of the invention which will become apparent as the following description proceeds, are attained by this variable depth motor mount, preferred embodiments of which have been illustrated in the accompanying drawings, by way of example only, wherein:

Figure 1 is a perspective view of a simplified form of variable depth outboard motor mount, including one means used for lockingly holding the operating lever in a selected position;

Figure 2 is a side elevational view of a modified form of motor mount employing a skeg or guard, the skeg being optionally used as a thrust member. When the skeg is used as a thrust member it will be attached to the motor boat with a swivel or universal joint. When not used as a thrust member it may be either so attached or it may not be attached and if not attached it will be arranged as the motor mount of Figure 11 so that a spring holds it up.

Figure 9 is a top plan view of an inboard motor mount employing the variable depth principles of this invention;

Figure 10 is a side elevational view of the inboard motor mount as is shown in Figure 9; and, Figure 11 is a side elevational view of an additional modified form of outboard motor mount employing a spring urged skeg pivotally attached to the stern transom of the boat and not attached to the foot of the motor column.

Figure 1:
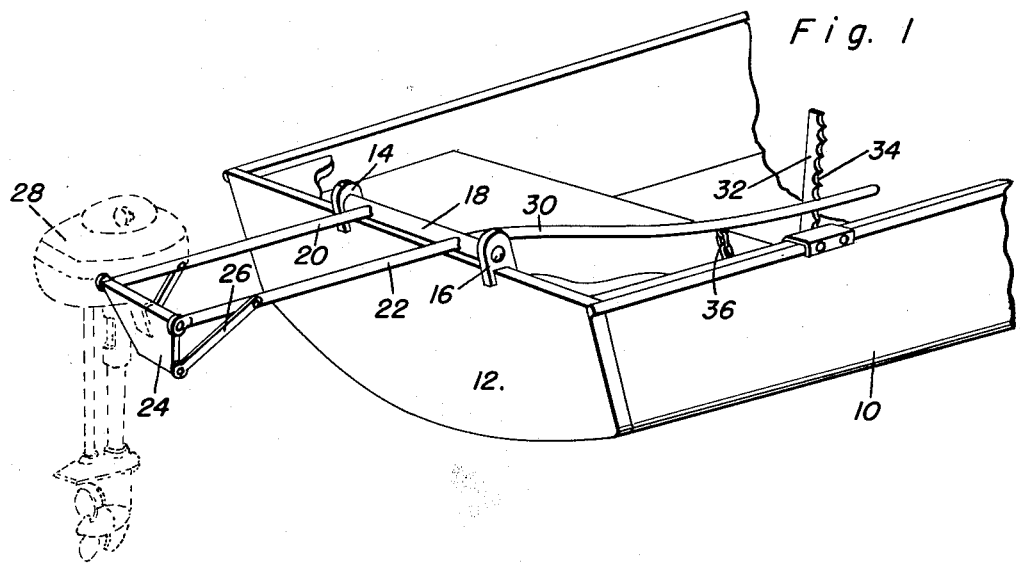

With continuing reference to the accompanying drawings wherein like reference numerals designate similar parts throughout the various views, and with initial reference to the basic form of the invention as shown in Figure 1 it will be seen that herein is provided a boat 10 of desired characteristics which has a stern transom 12 on which the variable depth outboard motor mount may be attached. This variable depth motor mount includes brackets 14 and 16 in which a transverse bar 18 is journalled. Rigidly attached to the transverse bar 18 are extension rods 20 and 22 which carry at their free ends the mounting plate 24 in the form of a false stern transom. The mounting plate 24 may be rigidified by means of braces 26. An outboard motor 28 of conventional design is adapted to be secured on the mounting plate 24 and is raised or lowered by means of the depth control lever 30 which is attached to the transverse bar 18. The lever is adapted to engage a holding member 32 which is affixed in a selected position on the boat 10. The holding member 32 is provided with a plurality of recesses 34 in which the lever 30 is adapted to seat so as to selectively determine the depth to which the motor 28 is inserted in the water. The holding member 32 is adapted to be used in any of the forms of this invention as desired and there is provided a chain 36 which is terminally attached to the lever 30 and the boat 10 so as to limit the lowermost position of the motor 28.

Figure 2:
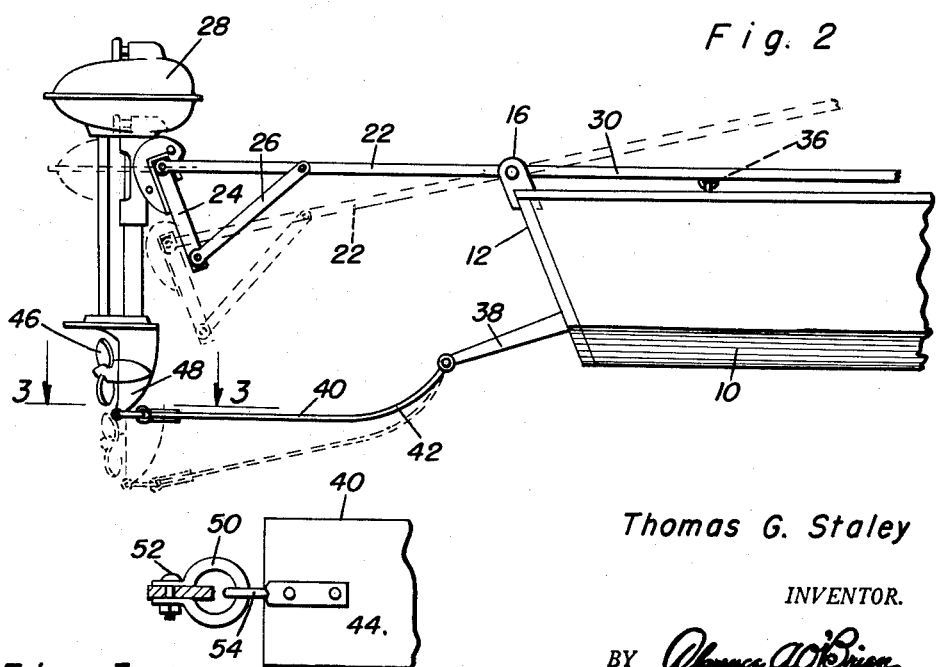
Figure 3:
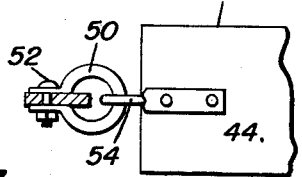
Figure 3 is a sectional detail view as taken along the plane of line of 3—3 in Figure 2 showing the manner in which the skeg is attached to the propeller guide of an outboard motor.

The form of the invention as is illustrated in Figures 2 and 3 is identical with the form of the invention as is shown in Figure 1 with the addition of a strut 38 which is attached to the transom 12. There is further provided a skeg 40 which is provided with an arcuate forward portion 42 pivotally attached to the strut 38. The skeg 40 has a flat plate portion 44 abaft the arcuate portion 42 which is adapted to engage and encounter any obstacle or obstruction in the shallow water being navigated thus protecting the propeller 46 of the motor 28. The skeg 40 is attached to the propeller guard 48 of the motor 28 by means of an eye member 50 which is bolted to the propeller guard 48 as at 52 or otherwise secured. The eye member 50 may be constructed in the form of a shackle and engages another eye piece 54 which is attached to the skeg 40. The form of the invention as in Figures 2 and 3 operates in the same manner as the invention illustrated in Figure 1 with the added reinforcing and the safety factors afforded by the skeg 40.

Figure 4:
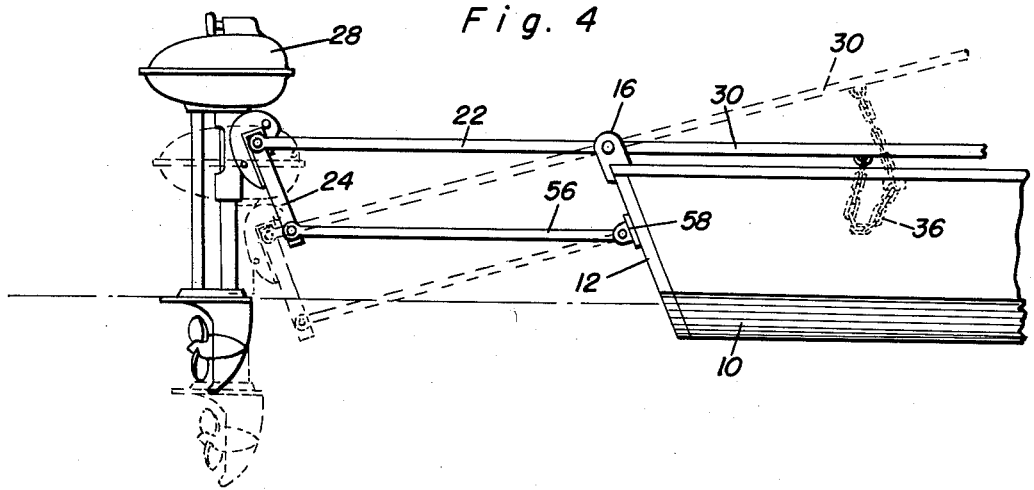
Figure 4 is a side elevational view of a further modified form of the invention employing a parallelogram linkage.

Referring to the embodiment of the invention as is shown in Figure 4 it will be seen that herein there is provided the elements forming the outboard motor mount as is shown in Figure 1 but in lieu of the braces 26 there is provided a pair of lower rods 56 which are terminally pivotally connected to the mounting plate 24 and to brackets 58 attached to the stern transom 12. The extension rods 22, the lower rods 56, the false transom 24 and the transom 12 provide a parallelogram linkage for supporting the motor 28.

Figure 5:
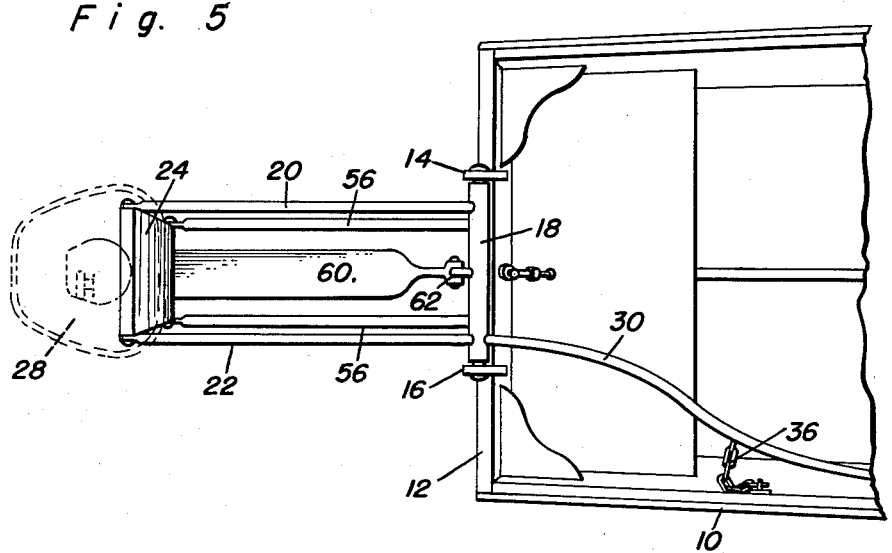
Figure 5 is a top plan view of a form of variable depth motor mount with a parallelogram linkage which employs the skeg and which includes a stop member for limiting the position of the motor.
Figure 6:
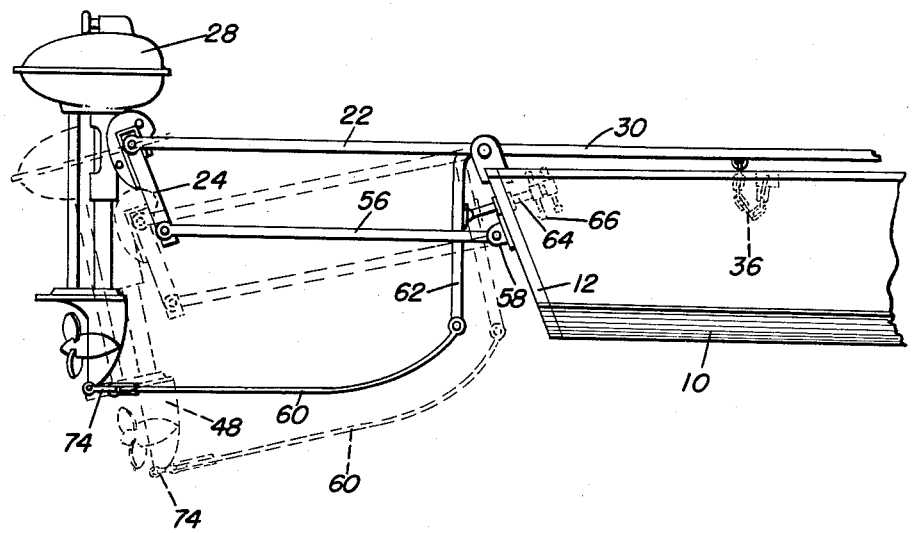
Figure 6 is a side elevational view of the form of the invention as is shown in Figure 5 but also shows an adjustable arm and screw for changing motor angle of tilt while in operation.

Referring now to the modification of the invention as is shown in Figures 5 and 6, it will be seen that herein there is used the lower rods 56 which are augmented by a skeg 60 which is terminally pivotally attached to the propeller guard 48 of the outboard motor 28 and to the free end of a skeg leg 62 which is attached to the transverse bar 18. In addition to or in lieu of the holding member 32, a screw stop member 64 is threadedly engaged in and extends through the transom 12 and abuts against the skeg leg 62 to limit the position of the motor 28. This can be best seen in Figure 6. A handle 66 is provided for actuating the stop member 64. The skeg 60 includes an arcuate forward portion 68 which terminates in a bifurcated end portion 70 adapted to embrace the skeg leg 62. A hinge plate 72 is attached to the substantially flat relatively wide main portion of the skeg 60 which is adapted to engage any obstacles or obstructions encountered so as to urge the motor 28 upwardly and out of the way so as not to encounter any obstacles. The hinge plate 72 provides a connection for the skeg 60 with a shackle 74 attached to the motor 28.

Figure 7:
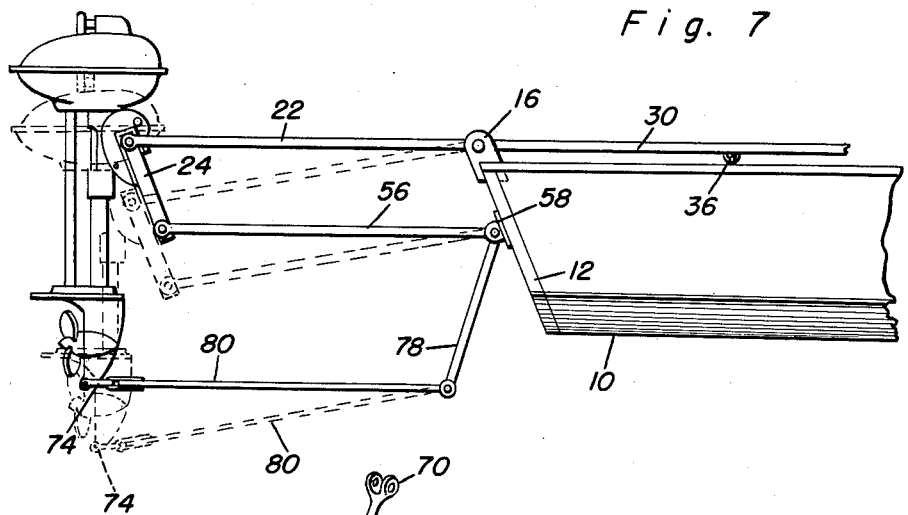
Figure 7 is a side elevational view of a further modification of the invention employing a double parallelogram linkage and also employing a pivotaly mounted skeg which is a member of one parallelogram.
Figure 8:
Figure 8 is a perspective view of the skeg as used in the modification of the invention as illustrated in Figures 5 and 6.

In the modified form of the invention as is shown in Figure 7, the lower rods 56 are used as is a skeg leg 78 which is pivotally attached to the brackets 58. A substantially flat skeg 80 is terminally pivotally attached to the shackle 74 and to the skeg leg 78.

In the outboard motor mount having the variable depth controlling means as is shown in Figure 11, there is provided a bracket 82 attached to the transom 12. A bracket 84 is further attached to the transom 12 to which a skeg 86 of desired design is attached. A spring 88 is terminally attached to the bracket 82 and the skeg 86 for continuously urging the skeg 86 upwardly and into engagement with the propeller guard 48 of the motor 28. Obviously the spring 88 could be readily positioned and connected to other portions of the variable depth motor mount for urging the skeg 86 upwardly.

If the boat 10 is supplied with an inboard motor 90 there is provided an alternate mounting means for varying the depth of the screw propeller 92 providing the propulsion means. The drive shaft 94 of the inboard engine 90 extends through the transom 12 and is connected to the propeller shaft 96 by means of a universal joint connection 98. The propeller shaft 96 is supported and journalled in a bearing 100 carried by a rudder mounting plate 102 which is pivotally attached to the connecting rods 20 and 22. The bearing 100 is rotatably mounted on the rudder mounting plate 102. A rudder 104 is carried by the rudder mounting plate 102 and suitable rudder actuation cables 106 are connected to the rudder post 108 for controlling the position of the rudder 104. The depth that the propeller 92 extends is controlled by the depth control lever 30 in the manner heretofore described.

Since from the foregoing, the construction and advantages of these variable depth motor mounts are readily apparent, further description is believed to be unnecessary.

However, since numerous modifications will ready occur to those skilled in the art after a consideration of the foregoing specification and accompanying drawings, it is not intended to limit the invention to the precise embodiments shown and described, but all suitable modifications and equivalents may be readily resorted to as desired.

What is claimed as new is as follows:

1. A variable depth motor mount comprising a transverse support adapted to be secured to the stern transom of a boat, said transverse support including a rotatably supported transverse bar, extension rods attached to said bar, a depth control device for rotating said transverse bar, a mounting plate carried by said extension rods and extending therebetween spaced from said stern transom, and a pair of lower rods pivotally terminally attached to said transom and said mounting plate, said extension rods, said lower rods, said transom, and said mounting plate forming a parallelogram linkage, a vertically extending holding member in said boat, said holding member having a plurality of lever engaging recesses therein, said depth control device including a lever attached to said transverse bar, said lever selectively engaging said holding member in a selected one of said recesses.

2. A variable depth motor mount comprising a transverse support adapted to be secured to the stern transom of a boat, said transverse support including a rotatably supported transverse bar, extension rods attached to said bar, a depth control device for rotating said transverse bar, a mounting plate carried by said extension rods and extending therebetween spaced from said stern transom, said mounting plate being adapted to support a motor, a vertically extending holding member in said boat, said holding member having a plurality of lever engaging recesses therein, said depth control device including a lever attached to said transverse bar, said lever selectively engaging said holding member in a selected one of said recesses.

3. A variable depth motor mount comprising a transverse support adapted to be secured to the stern transom of a boat, said transverse support including a rotatably supported transverse bar, extension rods attached to said bar, a depth control device for rotating said transverse bar, a mounting plate carried by said extension rods and extending therebetween spaced from said stern transom, said mounting plate being adapted to support a motor, a skeg leg attached to said transverse bar, a skeg pivotally terminally attached to said skeg leg and a motor supported on said mounting plate.

4. A variable depth motor mount comprising a transverse support adapted to be secured to the stern transom of a boat, said transverse support including a rotatably supported transverse bar, extension rods attached to said bar, a depth control device for rotating said transverse bar, a mounting plate carried by said extension rods and extending therebetween spaced from said stern transom, said mounting plate being adapted to support a motor, a skeg leg attached to said transverse bar, a skeg pivotally terminally attached to said skeg leg and a motor supported on said mounting plate, said depth control device including a threaded stop member threadedly engaged in said transom and extending therethrough, said stop member engaging said skeg leg.

5. A variable depth motor mount comprising a transverse support adapted to be secured to the stern transom of a boat, said transverse support including a rotatably supported transverse bar, extension rods attached to said bar, a depth control device for rotating said transverse bar, a mounting plate carried by said extension rods and extending therebetween spaced from said stern transom, said mounting plate being adapted to support a motor, a skeg leg attached to said transverse bar, a skeg pivotally terminally attached to said skeg leg and a motor supported on said mounting plate, said skeg having an arcuate forward portion having a bifurcate end adapted to embrace said skeg leg, said skeg including a relatively flat, relatively broad plate portion for protecting said motor.

6. A variable depth motor mount comprising a transverse support adapted to be secured to the stern transom of a boat, said transverse support including a rotatably supported transverse bar, extension rods attached to said bar, a depth control device for rotating said transverse bar, a mounting plate carried by said extension rods and extending therebetween spaced from said stern transom, said mounting plate being adapted to support a motor, a skeg leg attached to said transverse bar, a skeg pivotally terminally attached to said skeg leg and a motor supported on said mounting plate, said depth control device including a threaded stop member threadedly engaged in said transom and extending therethrough, said stop member engaging said skeg leg, said skeg having an arcuate forward portion having a bifurcate end adapted to embrace said skeg leg, said skeg including a relatively flat, relatively broad plate portion for protecting said motor.

7. A variable depth motor mount comprising a transverse support adapted to be secured to the stern transom of a boat, said transverse support including a rotatably supported transverse bar, extension rods attached to said bar, a depth control device for rotating said transverse bar, a mounting plate carried by said extension rods and extending therebetween spaced from said stern transom, said mounting plate being adapted to support a motor, a skeg leg attached to said transverse bar, a skeg pivotally terminally attached to said skeg leg and a motor supported on said mounting plate, a vertically extending holding member in said boat, and a plurality of lever engaging recesses in said holding member, said depth control device further including a lever attached to said transverse bar, said lever selectively engaging said holding member in a selected one of said recesses.

8. A variable depth motor mount comprising a transverse support adapted to be secured to the stern transom of a boat, said transverse support including a rotatably supported transverse bar, extension rods attached to said bar, a depth control device for rotating said transverse bar, a mounting plate carried by said extension rods and extending therebetween spaced from said stern transom, said mounting plate being adapted to support a motor, a skeg leg attached to said transverse bar, a skeg pivotally terminally attached to said skeg leg and a motor supported on said mounting plate, said depth control device including a threaded stop member threadedly engaged in said transom and extending therethrough, said stop member engaging said skeg leg, said skeg having an arcuate forward portion having a bifurcate end adapted to embrace said skeg leg, said skeg including a relatively flat, relatively broad plate portion for protecting said motor, a vertically extending holding member in said boat, and a plurality of lever engaging recesses in said holding member, said depth control device further including a lever attached to said transverse bar, said lever selectively engaging said holding member in a selected one of said recesses.

9. A variable depth motor mount comprising a transverse support adapted to be secured to the stern transom of a boat, said transverse support including a rotatably supported transverse bar, extension rods attached to said bar, a depth control device for rotating said transverse bar, a mounting plate carried by said extension rods and extending therebetween spaced from said stern transom, and a pair of lower rods pivotally terminally attached to said transom and said mounting plate, said extension rods, said lower rods, said transom, and said mounting plate forming a parallelogram linkage.

References Cited in the file of this patent

UNITED STATES PATENTS

| Number | Name | Date |
|---|---|---|
| 951,608 | Hawthorne | Mar. 8, 1910 |
| 1,141,196 | McLaren | June 1, 1915 |
| 1,831,739 | Decker | Nov. 10, 1931 |
| 2,135,907 | Miller | Nov. 8, 1938 |
| 2,138,600 | Harmon | Nov. 29, 1938 |
| 2,643,837 | Rivers | June 30, 1953 |